(12) United States Patent
Zhu et al.

(10) Patent No.: US 7,683,582 B2
(45) Date of Patent: Mar. 23, 2010

(54) SYSTEM AND METHOD FOR THERMAL MANAGEMENT OF A VEHICLE POWER SOURCE

(75) Inventors: Douglas Zhu, Canton, MI (US);
William David Treharne, Livonia, MI (US)

(73) Assignee: Ford Global Technologies, LLC, Dearborn, MI (US)

( * ) Notice: Subject to any disclaimer, the term of this patent is extended or adjusted under 35 U.S.C. 154(b) by 807 days.

(21) Appl. No.: 11/161,280

(22) Filed: Jul. 28, 2005

(65) Prior Publication Data

US 2007/0024244 A1 Feb. 1, 2007

(51) Int. Cl.
*H02J 7/04* (2006.01)
*G01K 1/08* (2006.01)
*H01J 7/16* (2006.01)
*H01M 2/00* (2006.01)
*H01M 10/50* (2006.01)
*H01M 14/00* (2006.01)

(52) U.S. Cl. ........... 320/150; 320/104; 320/154; 320/160; 429/7; 429/61; 429/62; 374/141

(58) Field of Classification Search .......... 320/150, 320/104; 429/7; 374/141
See application file for complete search history.

(56) References Cited

U.S. PATENT DOCUMENTS

| 5,795,664 A * | 8/1998 | Kelly ........................ 429/7 |
| 6,902,319 B2 * | 6/2005 | Wu et al. .................. 374/141 |
| 2003/0080714 A1 * | 5/2003 | Inoue et al. .............. 320/150 |

* cited by examiner

*Primary Examiner*—Patrick J Assouad
*Assistant Examiner*—Yalkew Fantu
(74) *Attorney, Agent, or Firm*—David B. Kelly; Brooks Kushman P.C.

(57) ABSTRACT

A system and method of controlling temperature of a vehicle power source. The method includes determining a representative temperature of the power source, determining an ambient zone in which the power source is operating, determining a thermal control action based on the representative temperature and the ambient zone, and adjusting the temperature of the power source based on the thermal control action.

20 Claims, 5 Drawing Sheets

SYSTEM AND METHOD FOR THERMAL MANAGEMENT OF A VEHICLE POWER SOURCE

BACKGROUND OF THE INVENTION

1. Field of the Invention

The present invention relates generally to the control of a vehicle, and more particularly to a system and method for thermal management of a power source of a vehicle, such as an electric or hybrid electric vehicle.

2. Background Art

Hybrid electric vehicles may include one or more power sources that need to be heated or cooled to attain a desired level of performance. For example, a battery may have degraded charging capacity near the upper and lower limits of its operating temperature range. As such, it is desirable to heat or cool a power source to provide improved performance and to do so in a manner that utilizes as little energy as possible.

SUMMARY OF THE INVENTION

In at least one embodiment of the present invention, a method of controlling temperature of a power source of a vehicle is provided. The method includes determining a representative temperature of the power source, determining an ambient zone in which the power source is operating, determining a thermal control action based on the representative temperature and the ambient zone, and adjusting the temperature of the power source based on the thermal control action.

In at least one other embodiment of the present invention, a system for controlling temperature of a vehicle power source is provided. The system includes a power source, an air circulation system for circulating air through the power source, and a control system. The power source has a plurality of temperature sensors for providing temperature data and a heating element. The control system determines a representative temperature value based on the temperature data and an ambient zone in which the power source is operating. The heating element is activated to heat the power source when the vehicle is not turned on and the representative temperature value is not greater than a first action threshold value.

DETAILED DESCRIPTION

Detailed embodiments of the present invention are disclosed herein; however, it is to be understood that the disclosed embodiments are merely exemplary of the invention that may be embodied in various and alternative forms. The figures are not necessarily to scale, some features may be exaggerated or minimized to show details of particular components. Therefore, specific structural and functional details disclosed herein are not to be interpreted as limiting, but merely as a representative basis for the claims and/or as a representative basis for teaching one skilled in the art to variously employ the present invention.

Figure 1:
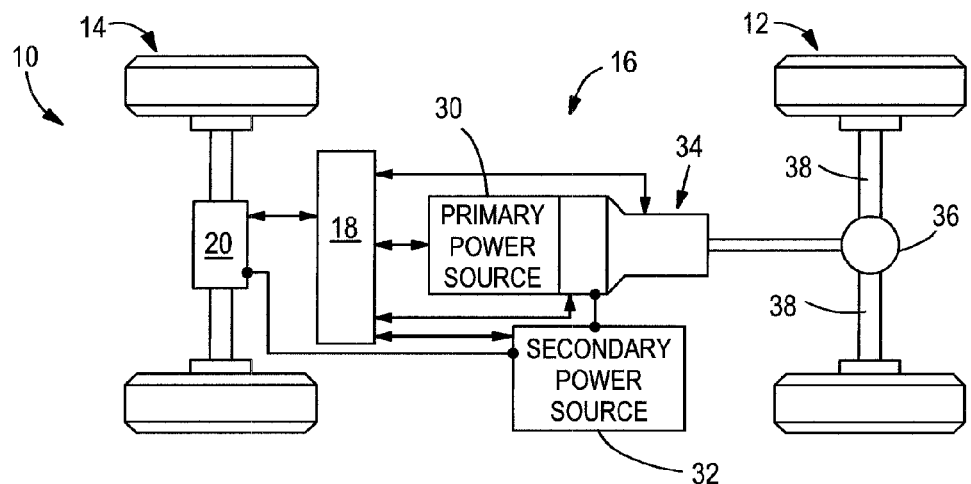
FIG. 1 is a schematic of an exemplary embodiment of a hybrid electric vehicle having a plurality of power sources.

Referring to FIG. 1, a schematic of a hybrid electric vehicle 10 is shown. The hybrid electric vehicle 10 includes a first wheel set 12, a second wheel set 14, a wheel drive system or powertrain 16, and a control system 18.

The powertrain 16 may be configured to drive or provide torque to the first and/or second wheel sets 12,14. In the embodiment shown, the first wheel set 12 is configured to be driven by the powertrain 16 while the second wheel set 14 is configured to be driven by an electrical machine 20, such as an electric motor. Alternatively, the second wheel set 14 may be provided without an electrical machine 20 in other embodiments of the present invention.

The hybrid electric vehicle 10 may include any suitable number of power sources. In the embodiment shown in FIG. 1, the hybrid electric vehicle 10 includes a primary power source 30 and a secondary power source 32.

The primary and secondary power sources 30,32 may be of any suitable type. For example, the primary and secondary power sources 30,32 may be electrical, non-electrical, or combinations thereof. Exemplary non-electrical power sources include, but are not limited to a hydraulic power source, flywheel, spring, compressed gases, or an internal combustion engine adapted to combust any suitable fuel like gasoline, diesel fuel, or hydrogen. Exemplary electrical power sources include, but are not limited to a battery, capacitor, or fuel cell. An exemplary electrical power source configured as a battery assembly will be described with reference to FIG. 2 in more detail below.

The primary and secondary power sources 30,32 may be adapted to provide power to a power transfer system 34 and/or electrical machine 20 to drive one or more vehicle wheels. The power transfer system 34 may have any suitable configuration, such as a series drive, parallel drive, or parallel-series transmission, also referred to as an electronic converterless transmission (e-CVT). In at least one embodiment, the power transfer system 34 may be connected to a differential 36 in any suitable manner, such as with a driveshaft, chain, or other mechanical linkage. The differential 36 may be connected to each wheel of the first wheel set 12 by one or more shafts 38, such as an axle or halfshaft.

The control system 18 may monitor and/or control various aspects of the hybrid electric vehicle 10, such as the electrical machine 20, primary power source 30, secondary power source 32, and/or power transfer system 34. The control system 18 may have any suitable configuration. For example, the control system 18 may include one or more controllers or control modules. The control system 18 may also receive input signals from one or more temperature sensors associated with a power source. For instance, the control system 18 may receive signals from temperature sensors associated with an air circulation system and/or a battery assembly as described in more detail below and/or a cooling system, such as an engine cooling system in various embodiments of the present invention.

Figure 2:
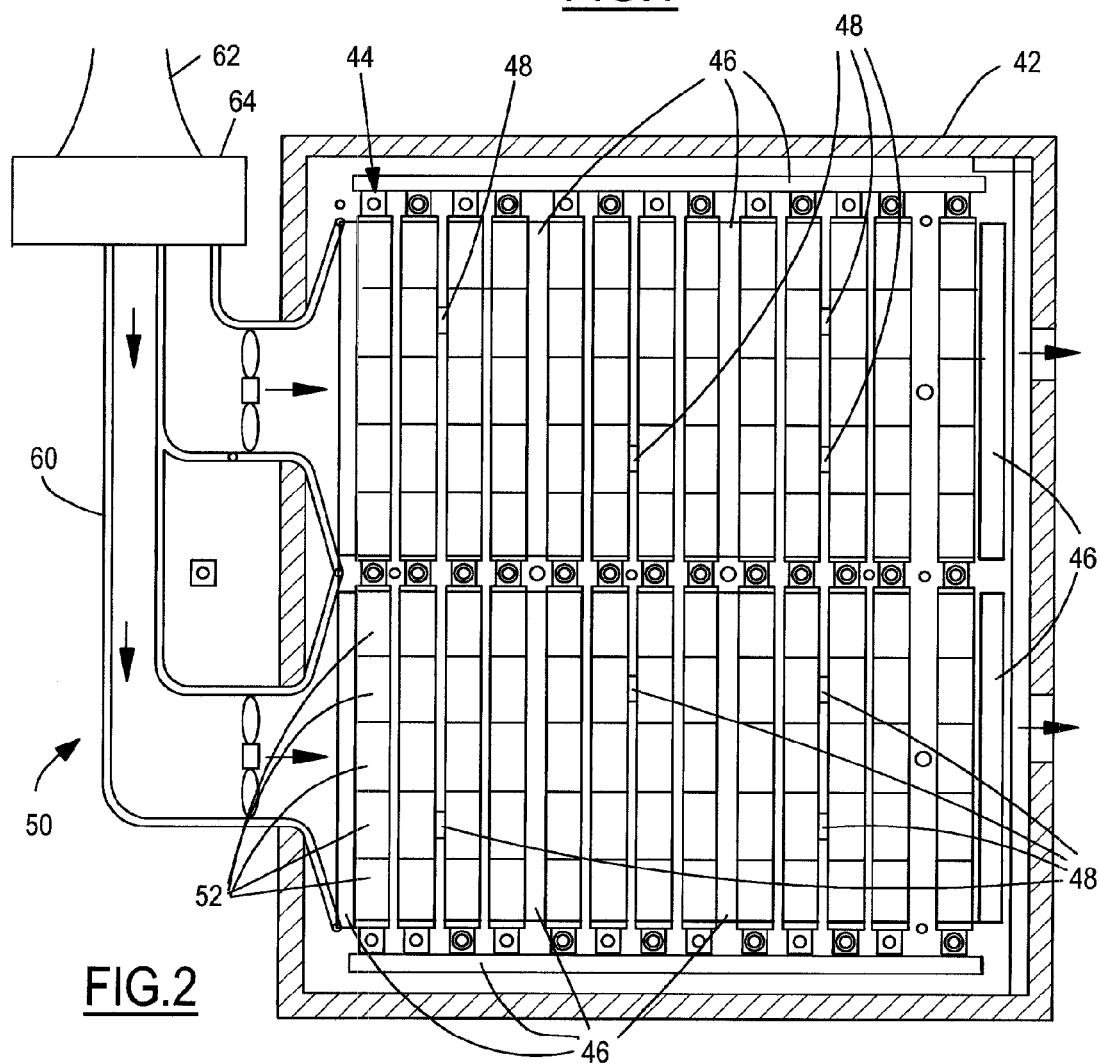
FIG. 2 is a magnified view of a power source configured as a battery assembly.

Referring to FIG. 2, an exemplary embodiment of an electrical power source configured as a battery assembly 40 is shown. The battery assembly 40 may be provided as one or more of the vehicle power sources, such as the primary and/or secondary power sources 30,32. In at least one embodiment, the battery assembly 40 may be configured to provide an elevated level of voltage (e.g., greater than approximately 50 volts).

The battery assembly 40 may include various components and subsystems for containing, controlling, and protecting the battery assembly and its associated components. In the embodiment shown, the battery assembly 40 includes a housing 42, one or more voltage modules 44, one or more heating elements 46, and a plurality of temperature sensors 48. In addition, the battery assembly 40 may be associated with an air circulation system 50 that provides air to the battery assembly 40 to help facilitate heating or cooling.

The housing 42 is configured to receive at least a portion of the voltage modules 44. The housing 42 may be made of any suitable material, such as a metal or a polymeric material.

The voltage modules 44 may be connected or selectively connected in series to provide a nominal level of voltage. Each member of the set of voltage modules 44 may have one or more cells 52. In the embodiment shown in FIG. 2, each voltage module 44 includes five cells. The cells 52 may have any suitable configuration and may be of any suitable type, such as nickel-metal hydride (Ni—MH), nickel-iron (Ni—Fe), nickel-cadmium (Ni—Cd), lead acid, zinc bromine (Zn—Br), sodium nickel chloride, sodium sulfur, or lithium based. Moreover, each cell 52 may provide a same or different nominal level of voltage.

Any suitable number of voltage modules 44 may be provided in any suitable configuration. For example, a nominal output voltage level of approximately 325 volts may be attained by combining fifty 6.5 volt voltage modules in series. For simplicity, the battery assembly 40 in FIG. 2 shows voltage modules arranged in one layer; however, the voltage modules may be provided in multiple layers in various embodiments of the present invention.

One or more heating elements 46 may be disposed in the housing 42 for heating the voltage modules 44. The heating elements 46 may be of any suitable type, such as resistive heating elements. In addition, the heating elements 46 may be arranged in any suitable manner. In the embodiment shown in FIG. 2, the heating elements 46 are dispersed throughout the battery assembly 40 and may be located near the housing 42 and between some of the voltage modules 44.

The plurality of temperature sensors 48 are provided to detect the temperature in various locations of the battery assembly 40. The temperature sensors 48 may be of any suitable type, such as a thermistor or thermocouple. In addition, the temperature sensors 48 may be arranged in any suitable manner. For instance, each temperature sensor 48 may be spaced apart from another temperature sensor 48 to provide temperature data from throughout the battery assembly 40. Moreover, each temperature sensor 48 may be disposed proximate at least one cell 52 of a voltage module 44.

The air circulation system 50 is adapted to provide and circulate air through the battery module 40. In the embodiment shown, the air circulation system 50 includes a plenum 60 having an air inlet 62 that may receive air from any suitable source, such as the vehicle passenger compartment, engine compartment, passenger compartment climate control system, and/or ambient surroundings. In at least one embodiment, the plenum 60 may be associated with an air conditioning system 64 that cools air provided through the air inlet 62. For example, a heat exchanger such as an evaporator core may be disposed in the plenum 60 for transferring heat from the inlet air. One or more fans 66 may be provided in the plenum 60 for directing air into the housing 42 where it may circulate around the voltage modules 44. For simplicity, the general direction of air circulation is represented by the arrowed lines in FIG. 2.

Referring to FIGS. 3-7, flowcharts associated with thermal management of a vehicle power source are shown. As will be appreciated by one of ordinary skill in the art, the flowcharts represent control logic which may be implemented using hardware, software, or combination of hardware and software. For example, the various functions may be performed using a programmed microprocessor. The control logic may be implemented using any of a number of known programming or processing techniques or strategies and is not limited to the order or sequence illustrated. For instance, interrupt or event-driven processing is employed in real-time control applications, rather than a purely sequential strategy as illustrated. Likewise, pair processing, multitasking, or multithreaded systems and methods may be used to accomplish the objectives, features, and advantages of the present invention.

This invention is independent of the particular programming language, operating system processor, or circuitry used to develop and/or implement the control logic illustrated. Likewise, depending upon the particular programming language and processing strategy, various functions may be performed in the sequence illustrated at substantially the same time or in a different sequence while accomplishing the features and advantages of the present invention. The illustrated functions may be modified or in some cases omitted without departing from the spirit or scope of the present invention.

Figure 3:
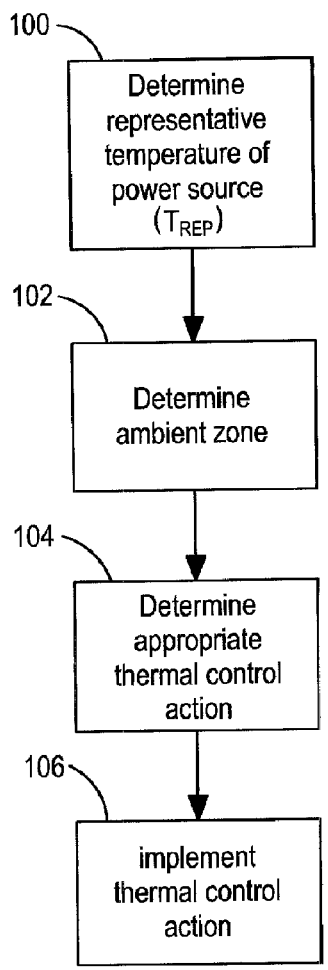
FIGS. 3-7 are flowcharts depicting a method for thermal management of a vehicle power source.

Referring to FIG. 3, a flowchart is shown that overviews a method of thermal control in accordance with the present invention. More detailed aspects of this flowchart are shown in FIGS. 4-7 and will be discussed in detail below.

In at least one embodiment, the thermal control method can be summarized as follows. At 100, the method begins by determining a representative temperature ($T_{REF}$) of the power source. At 102, a temperature region or ambient zone in which the power source is operating is determined based on data from temperature sensors associated with the power source. At 104, the method determines an appropriate thermal control action based on the representative temperature ($T_{REF}$) and the ambient zone. At 106, the method implements an appropriate thermal control action to adjust the temperature of the power source.

Figure 4:
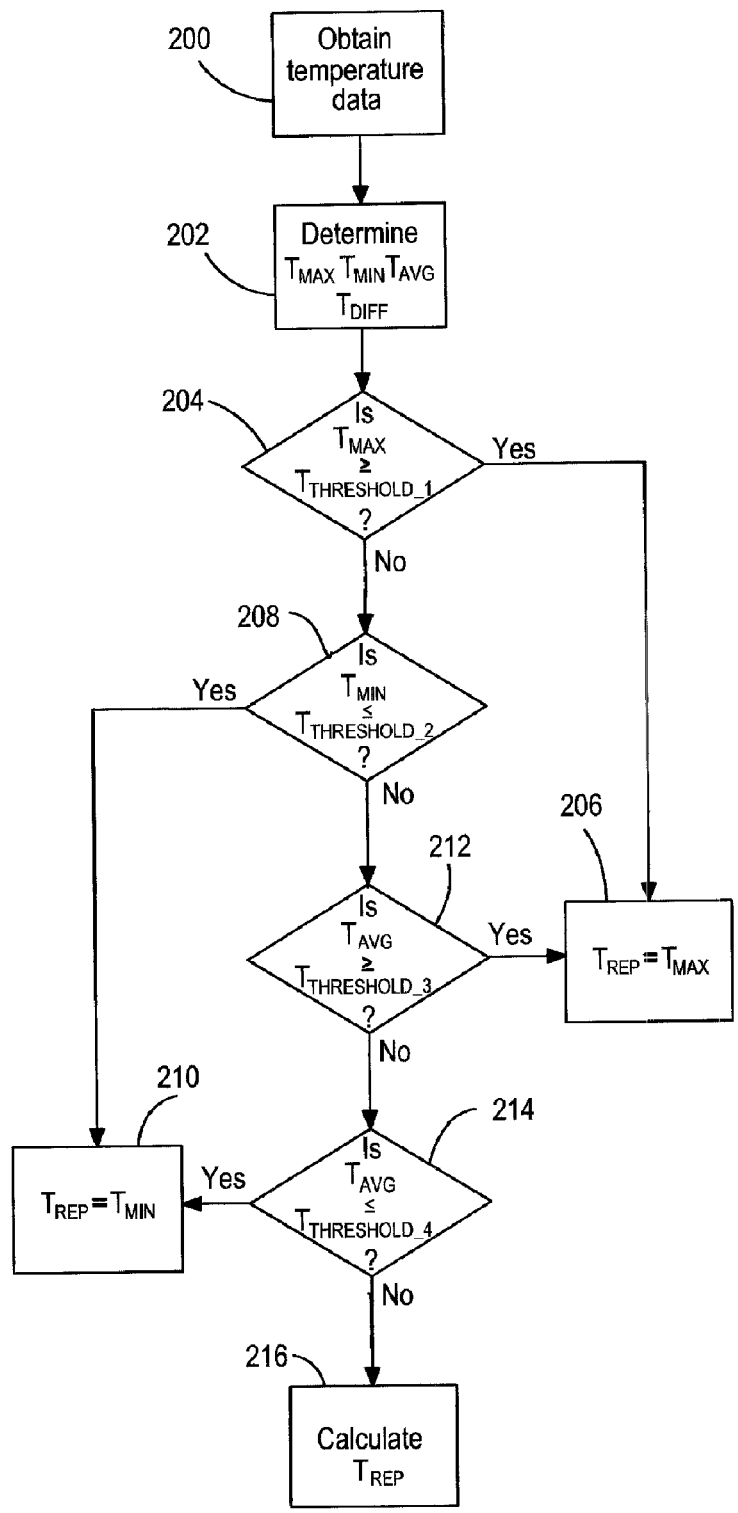

Referring to FIG. 4, steps associated with determining the representative temperature ($T_{REF}$). The representative temperature may be a single temperature value that represents a temperature of a power source, thereby simplifying power source control, performance estimates, temperature control, and/or fan speed control.

At 200, the method begins by obtaining or sampling temperature data from the temperature sensors 48 associated with the power source as previously described.

At 202, the method determines a maximum temperature value ($T_{MAX}$), a minimum temperature value ($T_{MIN}$), an average temperature value ($T_{AVG}$), and a differential temperature value ($T_{DIFF}$) based on the temperature data. $T_{MAX}$ is determined by selecting the maximum temperature value from the set of temperature data points. $T_{MIN}$ is determined by selecting the minimum temperature value from the set of temperature data points. $T_{AVG}$ is determined by averaging at least a portion of the set of temperature data points in any suitable manner, such as with an arithmetic, moving, or weighted average. $T_{DIFF}$ is the difference between the maximum and minimum temperature values (i.e., $T_{DIFF}=T_{MAX}-T_{MIN}$).

At 204, the maximum temperature value is compared to a first temperature threshold value ($T_{THRESHOLD\_1}$). The first temperature threshold value may be a predetermined constant, such as 35° C., that is based on vehicle development testing or performance attributes of the power source. If $T_{MAX}$ is greater than or equal to $T_{THRESHOLD\_1}$, then the representative temperature is set equal to the maximum temperature value ($T_{REF}=T_{MAX}$) at block 206. If $T_{MAX}$ is not greater than or equal to $T_{THRESHOLD\_1}$, then the method continues at block 208.

At 208, the minimum temperature value is compared to a second temperature threshold value ($T_{THRESHOLD\_2}$). The second temperature threshold value may be less than the first temperature threshold value and may also be a predetermined constant, such as 0° C., that is based on vehicle development testing or performance attributes of the power source. If $T_{MIN}$ is less than or equal to $T_{THRESHOLD\_2}$, then the representative temperature is set equal to the minimum temperature ($T_{REP}=T_{MIN}$) at block 210. If $T_{MIN}$ is not less than or equal to $T_{THRESHOLD\_2}$, then the method continues at block 212.

At 212, the average temperature value is compared to a third temperature threshold value ($T_{THRESHOLD\_3}$). The third temperature threshold value may be a predetermined constant, such as 30° C., that is based on vehicle development testing or performance attributes of the power source. Moreover, the third temperature threshold value may be less than the first temperature threshold value and greater than the second temperature threshold value. If $T_{AVG}$ is greater than or equal to $T_{THRESHOLD\_3}$, then the representative temperature is set equal to the maximum temperature value at block 206 as previously described. If $T_{AVG}$ is not greater than or equal to $T_{THRESHOLD\_3}$, then the method continues at block 214.

At 214, the average temperature value is compared to a fourth temperature threshold value ($T_{THRESHOLD\_4}$). The fourth temperature threshold value may be a predetermined constant, such as 5° C., that is based on vehicle development testing or performance attributes of the power source. Moreover, the fourth temperature threshold value may be less than the third temperature threshold value and greater than the second temperature threshold value. If $T_{AVG}$ is less than or equal to $T_{THRESHOLD\_4}$, then the representative temperature is set equal to the minimum temperature value at block 210 as previously described. If $T_{AVG}$ is less than or equal to $T_{THRESHOLD\_4}$, then the method continues at block 216.

At 216, the representative temperature may be calculated based on the expression:

$$T_{REP} = \left(1 + \frac{T_{DIFF}}{T_{THRESHOLD\_3} - T_{THRESHOLD\_4}}\right) \times \frac{T_{MAX} + T_{MIN}}{2} - T_{DIFF} \times \frac{\frac{T_{THRESHOLD\_3} + T_{THRESHOLD\_4}}{2}}{T_{THRESHOLD\_3} - T_{THRESHOLD\_4}}$$

where:
$T_{REP}$ is the representative temperature,
$T_{MAX}$ is the maximum temperature value,
$T_{MIN}$ is the minimum temperature value,
$T_{DIFF}$ is the difference between the maximum and minimum temperature values,
$T_{THRESHOLD\_3}$ is the third temperature threshold value, and
$T_{THRESHOLD\_4}$ is the fourth temperature threshold value.

The present invention also contemplates that a representative temperature value may be provided using different expressions, which may provide a same or different values as the expression presented above. As such, the representative temperature value may be based on one or more temperature readings provided by the temperature sensors associated with the power source.

Figure 5:
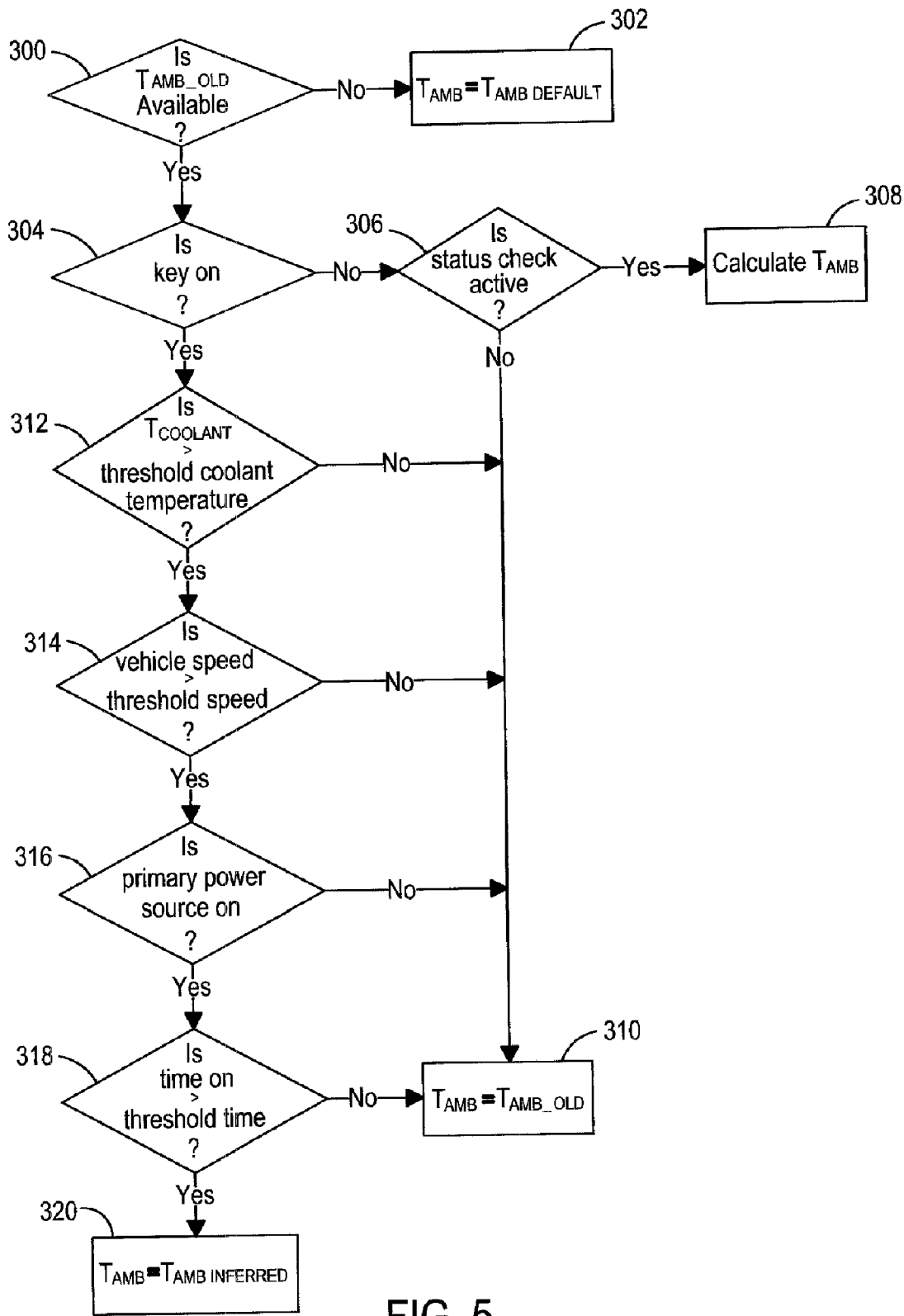
Figure 6:
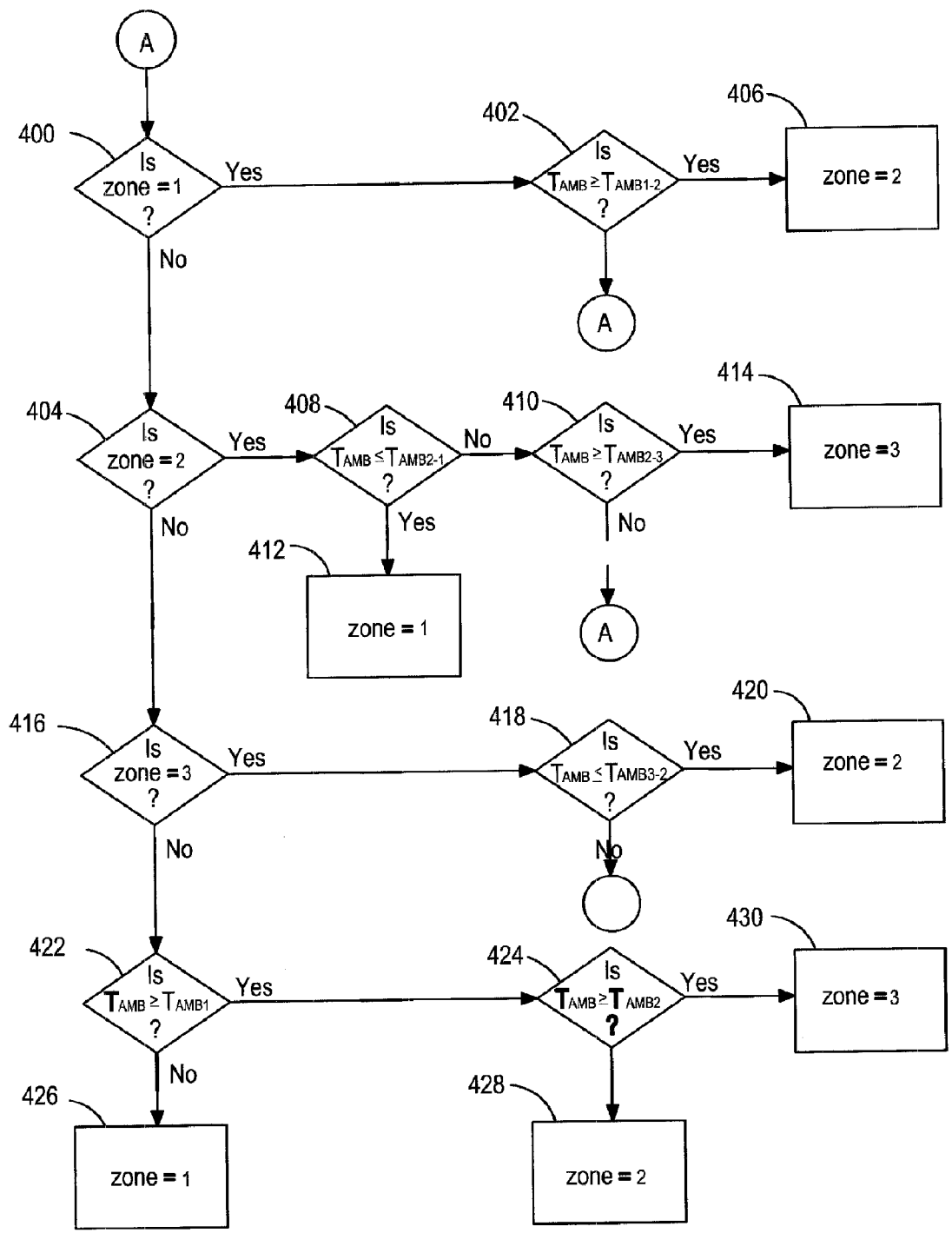

Referring to FIGS. 5 and 6, steps associated with determining the ambient zone are shown. More specifically, FIG. 5 depicts steps associated with determining an environmental or ambient temperature value ($T_{AMB}$), which is used in the ambient zone determination steps shown in FIG. 6. For clarity, these figures and their associated steps are discussed separately below. The ambient temperature value may be used to determine a prudent temperature control action. For instance, an air conditioning system may not be able to operate to cool a power source below a predetermined ambient temperature.

In at least one embodiment of the present invention, the ambient temperature value may be provided by an ambient temperature sensor. Determining an ambient temperature value as described below may allow an ambient temperature sensor to be deleted from the vehicle. In addition, vehicles equipped with one or more ambient temperature sensor may not always be available to provide temperature data. For example, an ambient temperature sensor may not operate when the vehicle is off. Additionally, ambient temperature sensors or sensing techniques associated with an engine may not provide accurate ambient temperature data when the engine is not running, such as in a hybrid electric vehicle that selectively activates an engine. For instance, ambient temperature values provided via an air intake manifold sensor may not be accurate unless the engine is running and there is sufficient airflow. The steps described below permit ambient temperature readings to be provided by a battery module when the vehicle is on or when the vehicle is off, such as when the battery module is running a status check.

At 300 in FIG. 5, the method begins by determining whether a previous ambient temperature value ($T_{AMB\_OLD}$) is available. $T_{AMB\_OLD}$ may be a value stored in memory and may have been determined during a prior iteration of the method. If $T_{AMB\_OLD}$ is not available, then the method continues at block 302. If $T_{AMB\_OLD}$ is available, then the method continues at block 304.

At 302, the ambient temperature value ($T_{AMB}$) is set equal to a default ambient temperature value ($T_{AMB\_DEFAULT}$). The default ambient temperature value may be a predetermined variable or constant value, such as 60° F. (15.6° C.), and may be based on vehicle development testing.

At 304, the method determines whether activation or startup of the vehicle has been requested. Activation on may be determined in any suitable manner, such as by the turning of an ignition key or a similar signal that represents a request for vehicle activation. For convenience, vehicle activation status is designated by the term "key on" in block 304. If key on condition does not exist (e.g., an ignition key is in the off position), then the method continues at 306. If a key on condition exists (e.g., an ignition key is turned to the on position), then the method continues at 312.

At 306, the method determines whether a status check of the power source is active or being conducted. During a status check, the power source may "wake up" to assess operational and environmental conditions. A status check may be conducted independent of vehicle activation status. If a status check is currently running or active, then the method continues at block 308. If a status check is not active, then the ambient temperature value is set equal to the previous ambient temperature value ($T_{AMB}=T_{AMB\_OLD}$) at block 310.

At 308, the method may calculate the ambient temperature value based on the following expression:

$$T_{AMB} = \frac{T_{AIR\_OLD} + T_{AIR}}{2} + \frac{THERM\_MASS}{H \times \Delta_{TIME}} \times (T_{AIR} - T_{AIR\_OLD})$$

where:
$T_{AMB}$ is the ambient temperature value,
$T_{AIR}$ is the current air temperature inside the power source,
$T_{AIR\_OLD}$ is the previous air temperature inside the power source,
THERM_MASS is the thermal mass of the power source,
H is the heat transfer coefficient of the power source, and
$\Delta_{TIME}$ is the time between status checks when the key is not on (i.e., when vehicle activation is not requested).

The present invention also contemplates that an ambient temperature value may be provided using different expressions, which may provide a same or different values as the expression presented above. In addition, the present invention also contemplates that an ambient temperature value may be provided by one or more ambient temperature sensors when available. For example, an ambient temperature value may be provided by an engine air intake manifold sensor when there is sufficient airflow or sufficient airflow for a threshold amount of time.

$T_{AIR}$ may be based on one or more temperature sensors disposed proximate the airstream passing through the power source. $T_{AIR\_OLD}$ may be a value stored in memory and may have been determined during a prior iteration of the method. The thermal mass and heat transfer coefficient may be predetermined values based on the size and design of the power source. $\Delta_{TIME}$ may be a predetermined value or may be provided by a timer that is incremented between status checks.

At 312, the method determines whether a coolant temperature value ($T_{COOLANT}$) exceeds a threshold coolant temperature. The threshold coolant temperature may be a predetermined constant or variable value based on vehicle development testing. If $T_{COOLANT}$ is greater than the threshold coolant temperature, then the method continues at block 314. If $T_{COOLANT}$ is not greater than the threshold coolant temperature, then the method continues at block 310 as previously described.

At 314, a vehicle speed value is compared to a threshold speed value. The vehicle speed value may be based on readings from one or more speed sensors or may be calculated in a manner known by those skilled in the art. The threshold speed value may be a predetermined constant or variable value based on vehicle development testing. If the vehicle speed value is greater than the threshold speed value, then the method continues at block 316. If the vehicle speed value is not greater than the threshold speed value, then the method continues at block 310 as previously described.

At 316, the method determines whether another power source 30, such as the primary power source, has been activated. Activation of the primary power source may be based on one or more signals representative of its operating status. If another power source is "on" or active, then the method continues at block 318. If another power source is off or not active, then the method continues at block 310 as previously described.

At 318, the time that another power source has been active, designated "time on", is compared to a threshold time value. For instance, the time on may be provided by a timer that is incremented while the primary power source is active. The threshold time value may be a predetermined constant or variable value that is determined by vehicle development testing. If the time on is greater than the threshold time value, then the ambient temperature value is set equal to an inferred ambient temperature value ($T_{AMB}=T_{AMB\_INFERRED}$) at block 320. The inferred ambient temperature value may be a predetermined constant or variable value based on vehicle development testing. If the time on value is not greater than the threshold time value, then the method continues at block 310 as previously described.

Referring to FIG. 6, steps associated with the determination of the ambient temperature zone are shown. In general, these steps involve determining whether a current ambient temperature zone has been defined, defining an current ambient temperature zone if a zone has not previously been selected, and changing the current ambient temperature zone in response to changed conditions. In the embodiment described below, three ambient zones are employed; however, the method may be configured with a larger or smaller number of zones in other embodiments of the present invention.

At 400, the method begins by assessing whether the current ambient temperature zone is zone one. If the ambient zone is zone one, then the method continues at block 402. If the ambient zone is not zone one, then the method continues at block 404.

At 402, the method determines whether the ambient temperature value is greater than or equal to a first transition threshold value ($T_{AMB1-2}$) indicative of a transition from zone one to zone two. The first transition threshold value may be a predetermined constant, such as 11° C., and may be based on vehicle development testing. If $T_{AMB}$ is greater than or equal to $T_{AMB1-2}$, then the current ambient zone is set to zone two at block 406. If $T_{AMB}$ is not greater than or equal to $T_{AMB1-2}$, then the current ambient zone is not changed (i.e., the ambient zone remains zone one).

At 404, the method determines whether the current ambient zone is zone two. If the ambient zone is zone two, then the method continues at block 408. If the ambient zone is not zone two, then the method continues at block 416.

At 408, the method determines whether the ambient temperature value is less than or equal to a second transition threshold value ($T_{AMB2-1}$) indicative of a transition from zone two to zone one. The second transition threshold value may be a predetermined constant, such as 5° C., and may be based on vehicle development testing. If $T_{AMB}$ is less than or equal to $T_{AMB2-1}$, then the current ambient zone is set to zone one at block 412. If $T_{AMB}$ is not less than or equal to $T_{AMB2-1}$, then the method continues at block 410.

At 410, the method determines whether the ambient temperature value is greater than a third transition threshold value ($T_{AMB2-3}$) indicative of a transition from zone two to zone three. The third transition threshold value may be a predetermined constant, such as 29° C., and may be based on vehicle development testing. If $T_{AMB}$ is greater than or equal to $T_{AMB2-3}$, then the current ambient zone is set to zone three at block 414. If $T_{AMB}$ is less than $T_{AMB2-3}$, then the current ambient zone is not changed (i.e., the ambient zone remains zone two).

At 416, the method determines whether the current ambient zone is zone three. If the ambient zone is zone three, then the method continues at block 418. If the ambient zone is not zone three, then the method continues at block 422.

At 418, the method determines whether the ambient temperature value is less than a fourth transition threshold value ($T_{AMB3-2}$) indicative of a transition from zone three to zone two. The second transition threshold value may be a predetermined constant, such as 23° C., and may be based on vehicle development testing. If $T_{AMB}$ is less than or equal to $T_{AMB3-2}$, then the current ambient zone is set to zone two at block 420. If $T_{AMB}$ is not less than or equal to $T_{AMB3-2}$, then the current ambient zone is not changed (i.e., the ambient zone remains zone three).

At 422, the current ambient temperature zone is undefined (e.g., not zone one, zone two, or zone three). The method then compares the ambient temperature value to a first zone threshold value ($T_{AMB1}$). The first zone threshold value may be a predetermined constant, such as 8° C., and may be based on vehicle development testing. If $T_{AMB}$ is greater than or equal to $T_{AMB1}$, then the method continues at block 424. If $T_{AMB}$ is not greater than or equal to $T_{AMB1}$, then the current ambient zone is set to zone one.

At 424, the ambient temperature value is compared to a second zone threshold value ($T_{AMB2}$). The second zone threshold value may be a predetermined constant, such as 26° C., and may be based on vehicle development testing. If $T_{AMB}$ is not greater than or equal to $T_{AMB2}$, then the current ambient zone is set to zone two at block 428. If $T_{AMB}$ is greater than or equal to $T_{AMB2}$, then the current ambient zone is set to zone two at block 430.

Figure 7:
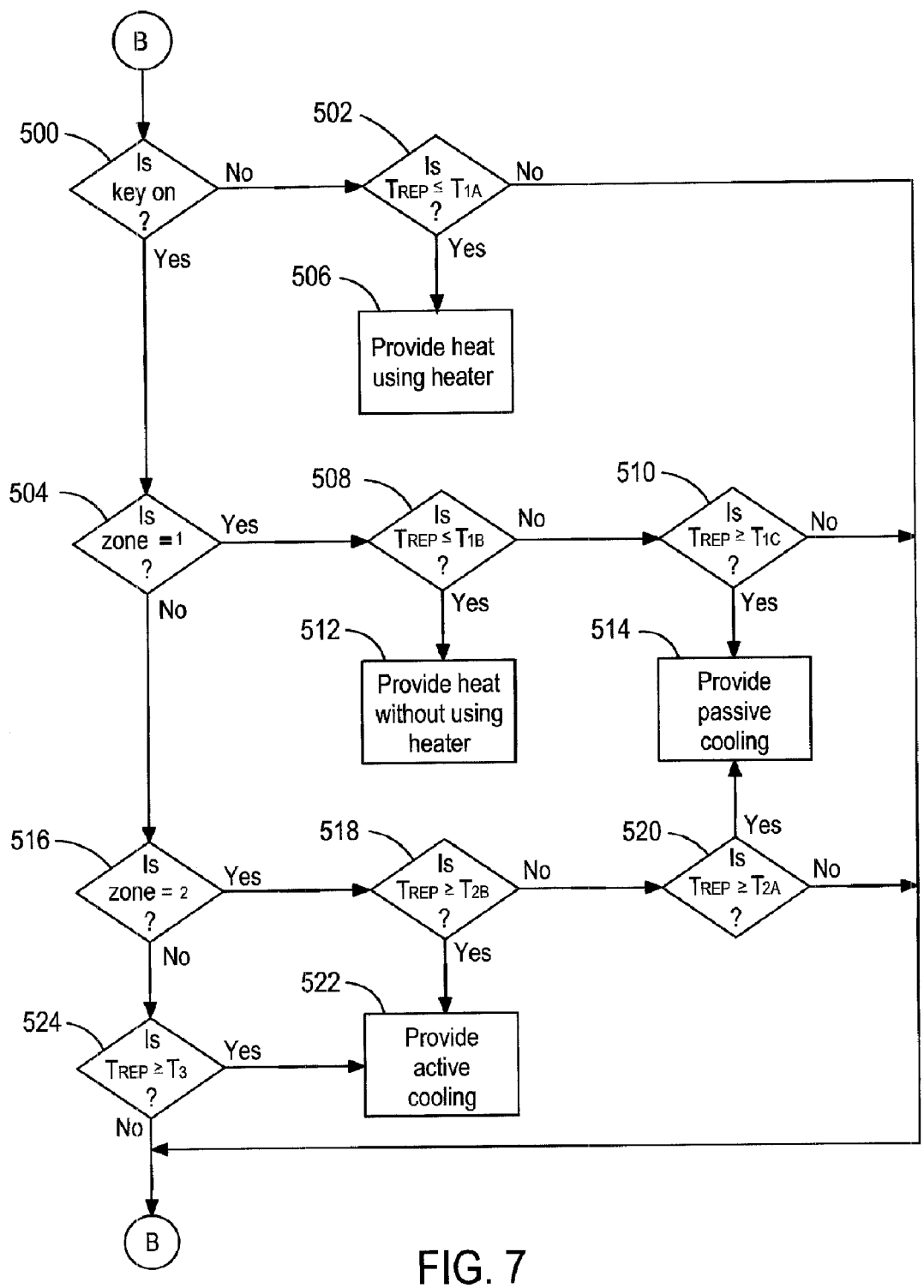

Referring to FIG. 7, steps associated with determining and implementing a thermal control action to attain a desired power source temperature are shown.

At 500, the method determines whether vehicle activation or a "key on" condition exists as previously described with reference to block 304. If key on condition does not exist (e.g., an ignition key is in the off position), then the method continues at block 502. If key on condition exists (e.g., an ignition key is in the on position), then the method continues at block 504.

At 502, the representative temperature value is compared to a first action threshold value ($T_{1A}$). The first action threshold value may be a predetermined constant, such as 5° C., and may be based on vehicle development testing. If $T_{REP}$ is less than or equal to $T_{1A}$, then the method continues at block 506. If $T_{REP}$ is not less than or equal to $T_{1A}$, then no change in the thermal control strategy occurs.

At 504, the method determines whether the current ambient zone is zone one. If the current ambient zone is zone one, then the method continues at block 508. If the current ambient zone is not zone one, then the method continues at block 516.

At 506, the power source is heated using a heat source associated with the power source, such as one or more heating elements 46. Heat may be provided at a constant or variable temperature depending on the type of heat source or energy available to operate the heat source.

At 508, the representative temperature value is compared to a second action threshold value ($T_{1B}$). The second action threshold value may be a predetermined constant, such as 5° C., and may be based on vehicle development testing. Moreover, the second action threshold value may be greater than or equal to the first threshold value. If $T_{REP}$ is less than or equal to $T_{1B}$, then the method continues at block 512. If $T_{REP}$ is not less than or equal to $T_{1B}$, then the method continues at block 510.

At 510, the representative temperature value is compared to a third action threshold value ($T_{1C}$). The third action threshold value may be a predetermined constant, such as 25° C., and may be based on vehicle development testing. Moreover, the third action threshold value may be greater than the first and second threshold values. If $T_{REP}$ is greater than or equal to $T_{1C}$, then the method continues at block 514. If $T_{REP}$ is not greater than or equal to $T_{1C}$, then no change in the thermal control strategy occurs.

At 512, the power source is heated without using the heat source or heating elements provided with the power source. Heating may be provided in an active or passive manner. Active heating may be provided by cyclic charging or discharging of the power source. Passive heating may occur by providing air from the vehicle passenger compartment or ambient surroundings that is warmer than at least a portion of the power source.

At 514, the passive cooling of the power source occurs. Passive cooling may be accomplished without operating an air conditioning system associated with the power source. For example, passive cooling may occur by providing air from the vehicle passenger compartment or ambient surroundings that is cooler than the power source.

At 516, the method determines whether the current ambient zone is zone two. If the current ambient zone is zone two, then the method continues at block 518. If the current ambient zone is not zone two, then the method continues at block 524.

At 518, the representative temperature value is compared to a fourth action threshold value ($T_{2B}$). The fourth action threshold value may be a predetermined constant, such as 35° C., and may be based on vehicle development testing. If $T_{REP}$ is greater than or equal to $T_{2B}$, then the method continues at block 522. If $T_{REP}$ is not greater than or equal to $T_{2B}$, then the method continues at block 520.

At 520, the representative temperature value compared to a fifth action threshold value ($T_{2A}$). The fifth action threshold value may be a predetermined constant, such as 27° C., and may be based on vehicle development testing. Moreover, the fifth action threshold value may be less than the fourth threshold value. If $T_{REP}$ is greater than or equal to $T_{2A}$, then passive cooling is provided at block 514 as previously described. If $T_{REP}$ is not greater than or equal to $T_{2A}$, then no change in the thermal control strategy occurs.

At 522, active cooling of the power source occurs. Active cooling may be provided by cooling the power source with the air conditioning system associated with the power source as previously described.

At 524, the representative temperature value is compared to a sixth action threshold value ($T_3$). The sixth action threshold value may be a predetermined constant, such as 32° C., and may be based on vehicle development testing. If $T_{REP}$ is greater than or equal to $T_3$, then active cooling is provided at block 522 as previously described. If $T_{REP}$ is not greater than or equal to $T_3$, then no change in the thermal control strategy occurs.

While the best mode for carrying out the invention has been described in detail, those familiar with the art to which this invention relates will recognize various alternative designs and embodiments for practicing the invention as defined by the following claims.

The present invention allows the heating and cooling actions described in blocks 506, 512, 514 and 522 to be selectively implemented to help attain a desired operating temperature. For example, in the case of a voltage source like a battery the operating temperature may be adjusted toward a nominal temperature at which charging and/or discharging performance is improved. Moreover the present invention allows aggressive heating and cooling strategies like those in blocks 506 and 522 to be employed when power source operating temperatures are more distant from a desired operating temperature as compared to the passive techniques in blocks 512 and 514. As such, less aggressive and/or resource intensive actions are pursued when possible, which may help reduce energy consumption.

While the best mode for carrying out the invention has been described in detail, those familiar with the art to which this invention relates will recognize various alternative designs and embodiments for practicing the invention as defined by the following claims.

What is claimed is:

1. A method of controlling a temperature of a power source of a vehicle, the method comprising:
   determining a representative temperature of the power source;
   determining an ambient zone in which the power source is operating;
   determining a thermal control action based on the representative temperature and the ambient zone; and
   adjusting the temperature of the power source based on the thermal control action.

2. The method of claim 1 wherein determining the representative temperature is based on temperature data provided by temperature sensors associated with the power source.

3. The method of claim 1 wherein determining the ambient zone further comprises:
   determining an ambient temperature value; and
   determining the ambient zone based on the ambient temperature value.

4. The method of claim 3 wherein determining the ambient temperature value is based on temperature data provided by temperature sensors associated with the power source, a vehicle speed value, and a coolant temperature value associated with an engine cooling system.

5. The method of claim 3 wherein determining the ambient zone further comprises selecting at least one zone from a plurality of ambient zones based on the ambient temperature value.

6. The method of claim 1 wherein the step of adjusting the temperature of the power source further comprises heating the power source with a heating element disposed proximate the power source when the vehicle is not turned on and the representative temperature value is not greater than a first action threshold value.

7. The method of claim 1 wherein the step of adjusting the temperature of the power source further comprises heating the power source without activating a heating element disposed proximate the power source when a first ambient zone is selected and the representative temperature is not greater than a second action threshold value.

8. The method of claim 1 wherein the step of adjusting the temperature of the power source further comprises passively cooling the power source when
   a first ambient zone is selected and the representative temperature is greater than a third action threshold value, or
   a second ambient zone is selected and the representative temperature is less than a fourth action threshold value and not less than a fifth action threshold value.

9. The method of claim 1 wherein the step of adjusting the temperature of the power source further comprises actively cooling the power source when
   a second ambient zone is selected and the representative temperature is not less than a fourth action threshold value, or
   the representative temperature is not less than a sixth action threshold value.

10. A method of controlling a temperature of a power source of a vehicle, the method comprising:
    determining a representative temperature of the power source based on temperature data provided by a plurality of temperature sensors disposed proximate the power source;
    determining an ambient temperature value based on at least one of a vehicle speed value, a coolant temperature value, and the temperature data;
    determining the ambient zone based on the ambient temperature value;
    determining a thermal control action based on the representative temperature and the ambient zone; and
    adjusting the temperature of the power source based on the thermal control action.

11. The method of claim 10 wherein the coolant temperature value is associated with a second power source and the step of determining the ambient temperature value further comprises:
    setting the ambient temperature value equal to a default ambient temperature value when a previous ambient temperature value is not available; and
    setting the ambient temperature value equal to the previous ambient temperature value when a power source status check is active, the coolant temperature value exceeds a threshold coolant temperature value, the vehicle speed value exceeds a threshold speed value, the second power source is not active, or when the second power source is active for a threshold amount of time.

12. The method of claim 10 wherein determining the representative temperature further comprises:
    determining maximum, minimum, average, and differential temperature values from the temperature data;
    setting the representative temperature value equal to the maximum temperature value when the maximum temperature value is greater than or equal to a first temperature threshold value or the average temperature value is greater than or equal to a third temperature threshold value; and
    setting the representative temperature value equal to the minimum temperature value equal to the minimum temperature value when the minimum temperature value is less than or equal to a second threshold value or the average temperature value is less than or equal to a fourth temperature threshold value.

13. A system for controlling a temperature of a power source of a vehicle, the system comprising:
    a power source having a plurality of temperature sensors for providing temperature data and a heating element;
    an air circulation system for circulating air through the power source; and
    a control system for determining a representative temperature value based on the temperature data and an ambient zone in which the power source is operating;
    wherein the heating element is activated to heat the power source when the vehicle is not turned on and the representative temperature value is not greater than a first action threshold value.

14. The system of claim 13 further comprising heating the power source without activating a heating element when a first ambient zone is selected and the representative temperature is not greater than a second action threshold value.

15. The system of claim 14 wherein heating the power source without activating the heating element further comprises cyclically charging and discharging the power source.

16. The system of claim 14 wherein heating the power source without activating the heating element further comprises providing air having a temperature greater than the representative temperature with the air circulation system.

17. The system of claim 13 further comprising passively cooling the power source when
    a first ambient zone is selected and the representative temperature is greater than second and third action threshold values, or
    a second ambient zone is selected and the representative temperature is less than a fourth action threshold value and not less than a fifth action threshold value.

18. The system of claim 13 further comprising actively cooling the power source when
    a second ambient zone is selected and the representative temperature is not less than a fourth action threshold value, or
    the representative temperature is not less than a sixth action threshold value.

19. The system of claim 13 wherein the power source is a voltage source.

20. The system of claim 13 wherein the power source is a battery assembly.

* * * * *